United States Patent
Fukushima et al.

(10) Patent No.: US 7,630,567 B2
(45) Date of Patent: Dec. 8, 2009

(54) ADAPTIVE IMAGE CODING WITH PRESSURE-SELECTED REGIONS

(75) Inventors: Seigo Fukushima, Kanagawa (JP); Makoto Yamada, Tokyo (JP)

(73) Assignee: Sony Corporation, Tokyo (JP)

( * ) Notice: Subject to any disclaimer, the term of this patent is extended or adjusted under 35 U.S.C. 154(b) by 884 days.

(21) Appl. No.: 11/086,234

(22) Filed: Mar. 23, 2005

(65) Prior Publication Data
US 2005/0232502 A1    Oct. 20, 2005

(30) Foreign Application Priority Data
Apr. 2, 2004    (JP)    .............................. 2004-109996

(51) Int. Cl.
*G06K 9/36*    (2006.01)
(52) U.S. Cl. .................................... 382/239
(58) Field of Classification Search ................. 382/239; 375/240.03
See application file for complete search history.

(56) References Cited

U.S. PATENT DOCUMENTS 5,432,871 A  *  7/1995  Novik .......................... 382/232
6,490,319 B1 * 12/2002 Yang ..................... 375/240.03
7,167,519 B2 *  1/2007 Comaniciu et al. ..... 375/240.08

FOREIGN PATENT DOCUMENTS

| JP | 10-271515    | 10/1998 |
| JP | 2002-064790  | 2/2002  |
| JP | 2002-165098  | 6/2002  |
| JP | 2004-064115  | 2/2004  |

* cited by examiner

*Primary Examiner*—Wenpeng Chen
(74) *Attorney, Agent, or Firm*—Oblon, Spivak, McClelland, Maier & Neustadt, L.L.P.

(57) ABSTRACT

In an image coding method, an area of interest is specified in a captured image displayed on a display section. Positional information of the area of interest is obtained. The compression rate of the area of interest and the compression rate of the remaining area are set in such a manner as to differ from each other on the basis of the positional information. Coding of the area of interest and coding of the remaining area are performed on the basis of the corresponding compression rates.

18 Claims, 8 Drawing Sheets

ADAPTIVE IMAGE CODING WITH PRESSURE-SELECTED REGIONS

CROSS REFERENCES TO RELATED APPLICATIONS

The present invention contains subject matter related to Japanese Patent Application JP 2004-109996 filed in the Japanese Patent Office on Apr. 2, 2004, the entire contents of which are incorporated herein by reference.

BACKGROUND OF THE INVENTION

1. Field of the Invention

The present invention relates to an image coding method, an imaging apparatus, and a computer program.

2. Description of the Related Art

In an image coding method of the related art, the entire range of an image is compressed at a uniform compression rate, and the amount of code is uniform in the entire range of one image. For this reason, an image coding method for coding a range of interest in an image in such a manner as to be distinguished from the other range has been proposed (see, for example, Japanese Unexamined Patent Application Publication No. 9-284620).

According to the above-described method, the range viewed by a cameraman is detected by a line-of-sight detection device, such as a finder unit, the inside of the viewed range is compressed at a compression rate lower than that of the other portions, and thus a much larger amount of code can be allocated.

SUMMARY OF THE INVENTION

However, in the above-described method, in order to keep high the amount of code of a desired portion, a cameraman needs to fix his/her line of sight in that portion and cannot move their line of sight to another portion of the image being captured. Therefore, there is a problem in that searching for another portion in which the amount of code should be kept high is difficult.

Accordingly, the present invention has been made in view of such problems. It is preferable to provide an image coding method by which a user can easily specify an area of interest in a captured image and can change the amount of code between the specified area of interest and a remaining area, an imaging apparatus for use with the image coding method, and a computer program for use therewith.

According to an embodiment of the present invention, there is provided an image coding method including the steps of: specifying an area of interest in a captured image displayed on a display section; obtaining positional information of the area of interest; setting the compression rate of the area of interest and the compression rate of a remaining area in such a manner as to differ from each other on the basis of the positional information; and performing coding of the area of interest and coding of the remaining area on the basis of the corresponding compression rates.

The captured image contains a moving image and a still image, and the display section can display the image being captured almost in real time. The area of interest is an area in which a difference in the compression rate is provided with respect to the remaining area of the captured image, and the user can specify the area of interest as desired. The positional information of the area of interest is information that can specify the position of the area of interest in the captured image. Specifically, the positional information is, for example, coordinate information.

According to the embodiment of the present invention, in the captured image of the display section on which an image being captured is displayed in real time, an area of interest is specified. Therefore, a user, such as a cameraman, can confirm the captured image in real time while capturing the subject, and can specify the area of interest. The specified area of interest is specified by the positional information, and different compression rates are set between the specified area of interest and the remaining area other than the area of interest of the captured image, and each area is coded on the basis of the compression rate. As a result, the image quality of the area of interest specified in the captured image by the user can be increased or decreased.

The compression rate of the area of interest may be set lower than the compression rate of the remaining area. According to such a configuration, the area of interest, which is made to have an image quality higher than that of the remaining area, can be recorded, transmitted, or the like.

The compression rate of the area of interest and the compression rate of the remaining area may be set in accordance with a target amount of code. The target amount of code is set on the basis of an upper-limit coding amount that is determined as a recordable or transmittable format, for example, when a captured image is recorded on a recording medium or when a captured image is transmitted to another computer via an external I/F. According to such a configuration, by setting the compression rates of the area of interest and the remaining area so that the amount of code becomes less than a target amount of code as the entire captured image, the captured image can be made to conform to the above-described format.

The target amount of code may be set with respect to one frame of the captured image. The "frame" is a frame image forming a moving image. According to such a configuration, since each compression rate is set so that each frame image has a target amount of code or less, all the frame images in the moving image can be made to have almost the same target amount of code.

The target amount of code may be set with respect to the time unit of the captured image. The setting of the target amount of code in the time unit means that, when the captured image is a moving image, the target amount of code is determined for each predetermined time. According to such a configuration, since the amount of code needs only to be less than the target amount of code, different amounts of coding can be allocated between frame images. Therefore, when, for example, a frame image having many areas of interest to which a large amount of code needs to be allocated and a frame image having a small number of areas of interest exist within the same predetermined time, it becomes possible to allocate a much larger amount of code to a frame image having many areas of interest.

In the image coding method, the specification of the area of interest may be performed by pressure application of the display section, the pressure application may be detected, and the compression rate of the area of interest may be set in accordance with the pressure application. According to such a configuration, since the specification of the area of interest can be performed by pressure application of the display section, it is possible for the user to specify the area of interest simply and easily. Furthermore, as a result of the compression rate of the area of interest being set in accordance with pressure application, a different compression rate can be allocated even in the area of interest. The detection of pressure application is possible if a device capable of detecting the intensity of pressure application, for example, a tablet, is provided in the display section.

The image coding method may further include recognizing a predetermined tracking object from the area of interest, and changing the area of interest in accordance with the movement of the tracking object. According to such a configuration, the tracking object can always be contained in the area of interest. For example, the compression rate of the tracking object can be decreased to perform recording with high image quality.

According to another embodiment of the present invention, there is provided an imaging apparatus capable of performing the image coding method. The imaging apparatus includes a display section for displaying a captured image; an input section for specifying an area of interest and obtaining positional information thereof; a control section for setting a compression rate; and a compression section for performing a coding step. According to another embodiment of the present invention, there is provided a computer program for enabling a computer to function as such an imaging apparatus.

As described in the foregoing, according to the present invention, an image coding method by which a user can easily specify an area of interest in a captured image and can make the amount of code in the specified area of interest differ from the amount of code in a remaining area, an imaging apparatus for use with the image coding method, and a computer program for use therewith can be provided.

DETAILED DESCRIPTION OF THE PREFERRED EMBODIMENTS

Figure 1:
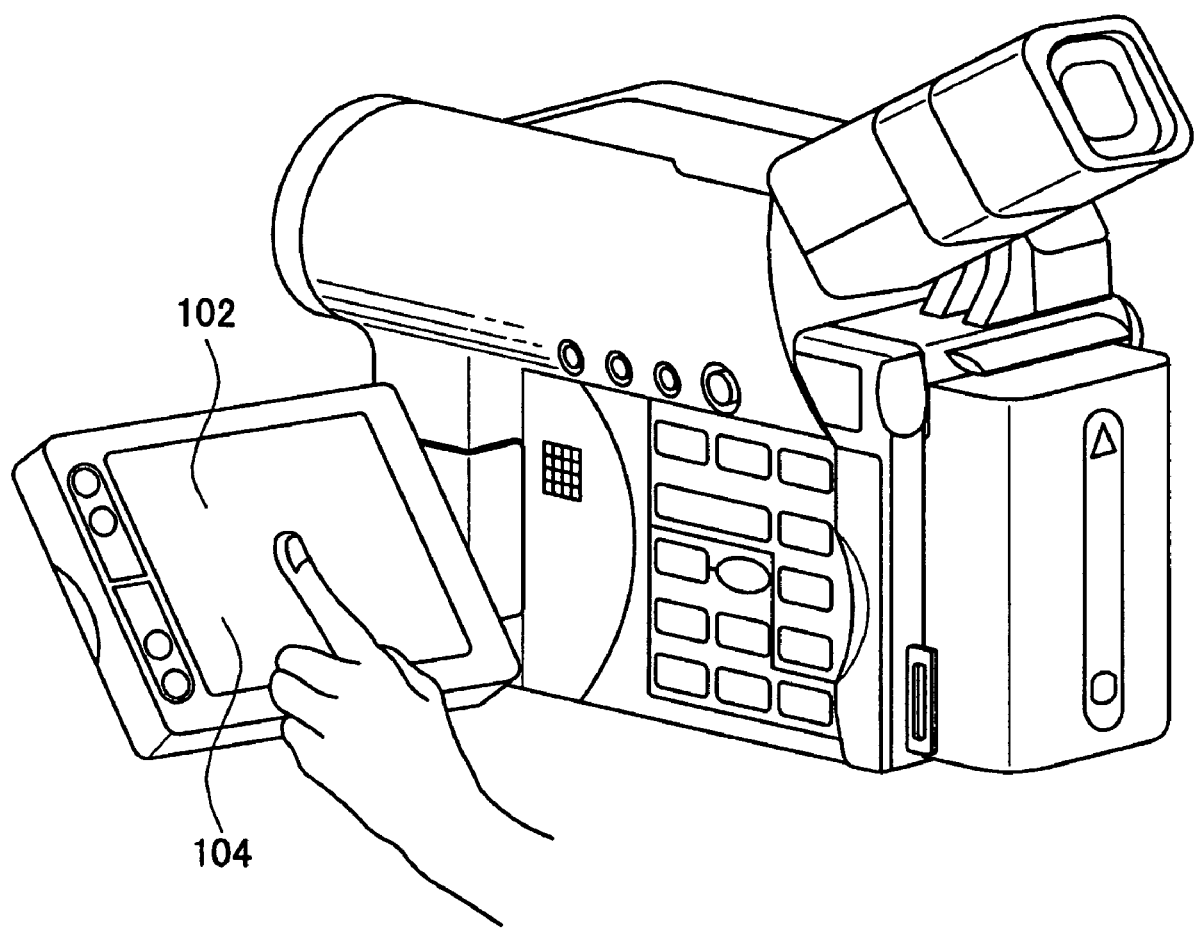
FIG. 1 is an illustration of an imaging apparatus according to an embodiment of the present invention.

Preferred embodiments of the present invention will now be described below in detail with reference to the attached drawings. In this specification and the drawings, components having substantially identical functions are designated with the same reference numerals, and thus, a duplicate description is omitted.

In this embodiment, a description is given by applying an imaging apparatus according to the present invention to an imaging apparatus 100, which is a digital video camera capable of capturing a moving image and by applying an image coding method according to the present invention to a method for coding a frame image forming a moving image in the imaging apparatus 100. The present invention is not restricted to such examples and can be applied to any imaging apparatus, such as a digital camera for capturing a still image, having a function for converting image-captured analog data into digital data and having a function for displaying a captured image in real time.

First, the imaging apparatus 100 according to this embodiment is described briefly with reference to FIG. 1. As described above, the imaging apparatus 100 is a digital video camera, and includes an imaging section for capturing a subject, a display section 102 for displaying a captured image in real time, and an input section 104 provided in the display section 102.

The display section 102 is, for example, a liquid-crystal screen on which a captured image is displayed in real time. Therefore, a user, such as a cameraman, can confirm a moving image currently being captured via the display section 102 at the same time as when the moving image is captured.

The input section 104 is, for example, a touch panel, with, for example, a transparent touch panel sheet being provided on the display section 10. As shown in FIG. 1, the input section 104 detects that the user has touched the display section 102 by a fingertip or a pen point and can detect the positional information thereof. The positional information is specifically, for example, coordinate information. As a result of the input section 104 being appropriately disposed on the display section 102, the input section 104 can detect the coordinate information in the display section 102 of the portion touched by the user.

Figure 2:
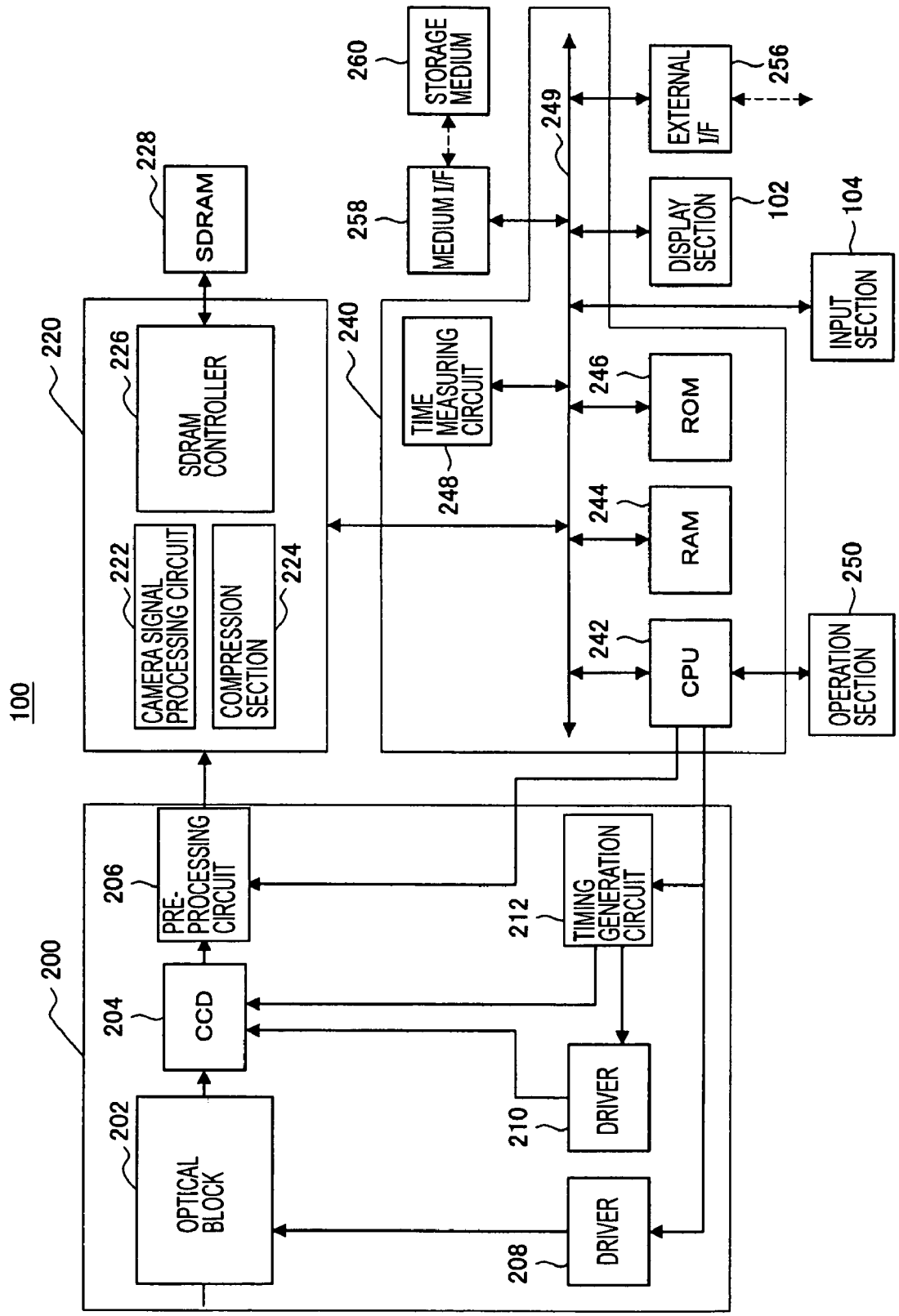
FIG. 2 is a block diagram showing the configuration of the imaging apparatus according to the embodiment of the present invention.

In the foregoing, the imaging apparatus 100 has been described briefly. Next, the overall configuration of the imaging apparatus 100 according to this embodiment will be described with reference to FIG. 2.

The imaging apparatus 100 broadly includes, for example, an imaging section 200, a camera DSP (Digital Signal Processor) 220, an SDRAM (Synchronous Dynamic Random Access Memory) 228, a medium interface (hereinafter referred to as a "medium I/F") 258, a control section 240, an operation section 250, a display section 102, an input section 104, and an external interface (hereinafter referred to as an "external I/F") 256. A recording medium 260 can be loaded into and removed from the imaging apparatus 100.

The imaging section 200 includes, for example, an optical block 202, a CCD (Charge Coupled Device) 204, a preprocessing circuit 206, a driver 208 for an optical block, a CCD driver 210, and a timing generation circuit 212. Here, the optical block 202 includes a lens, a focusing mechanism, a shutter mechanism, an aperture mechanism, and the like.

The control section 240 is a microcomputer that is configured in such a way that, for example, a CPU (Central Processing Unit) 242, a RAM (Random Access Memory) 244, a ROM (Read Only Memory) 246, and a time measuring circuit 248 are connected to one another via a system bus 249. The control section 240 centrally controls the imaging apparatus 100, and controls the compression rate when a compression section 224 compresses each frame image of a moving image, as will be described later.

Here, the RAM 244 is used mainly as a work area for temporarily storing processing in-progress results. The ROM 246 has stored therein various programs executed by the CPU 242 and data required for processing. The time measuring circuit 248 can provide the current year, month, and day, the current day of the week, and the current time, and also can provide the date and time of the image capture.

When an image is captured, the driver 208 for an optical block forms a driving signal for operating the optical block 202 under the control of the control section 240 and supplies the driving signal to the optical block 202, causing the optical block 202 to be operated. In the optical block 202, the shutter mechanism, the focusing mechanism, and the aperture mechanism are controlled in response to the driving signal from the driver 208, the image of the subject is received, and this image is provided to the CCD 204.

The CCD 204 photoelectrically converts the image from the optical block 202 and outputs it. The CCD 204 operates in response to the driving signal from the CCD driver 210, and receives the image of the subject from the optical block 202. Also, the CCD 204 supplies the received image of the subject (the image information) as an electrical signal to the preprocessing circuit 206 on the basis of the timing signal from the timing generation circuit 212 controlled by the control section 240.

As described above, the timing generation circuit 212 forms a timing signal for providing a predetermined timing under the control of the control section 240. The CCD driver 210 forms a driving signal to be supplied to the CCD 204 in accordance with the timing signal from the timing generation circuit 212.

The preprocessing circuit 206 performs CDS (Correlated Double Sampling) processing on the image information of the supplied electrical signal in order to maintain a satisfactory S/N ratio, performs AGC (Automatic Gain Control) processing in order to control the gain, and performs an A/D (Analog/Digital) conversion in order to form image data, which is formed as a digital signal.

The image data, which is formed as a digital signal, from the preprocessing circuit 206, is supplied to the DSP 220. The DSP 220 performs camera signal processing, such as AF (Auto Focus), AE (Auto Exposure), and AWB (Auto White Balance), on the supplied image data. The image data on which various adjustments are performed in this manner is compressed by a predetermined compression method and is supplied to a recording medium 260 via the system bus 249 and the medium I/F 258. Alternatively, the image data can also be transmitted to an external computer via an example I/F.

On the display section 102, the captured image is displayed as described above. The input section 104 detects the coordinate information of the portion touched by the user as described above. The detected coordinate information is stored in, for example, the RAM 244 and is referred to when the control section 240 controls the compression rate of the image.

For the recording medium 260, various media, such as a memory card using a semiconductor memory, an optical recording medium, such as a recordable DVD (Digital Versatile Disc) and a recordable CD (Compact Disc), and a magnetic disk, can be used.

Figure 3:
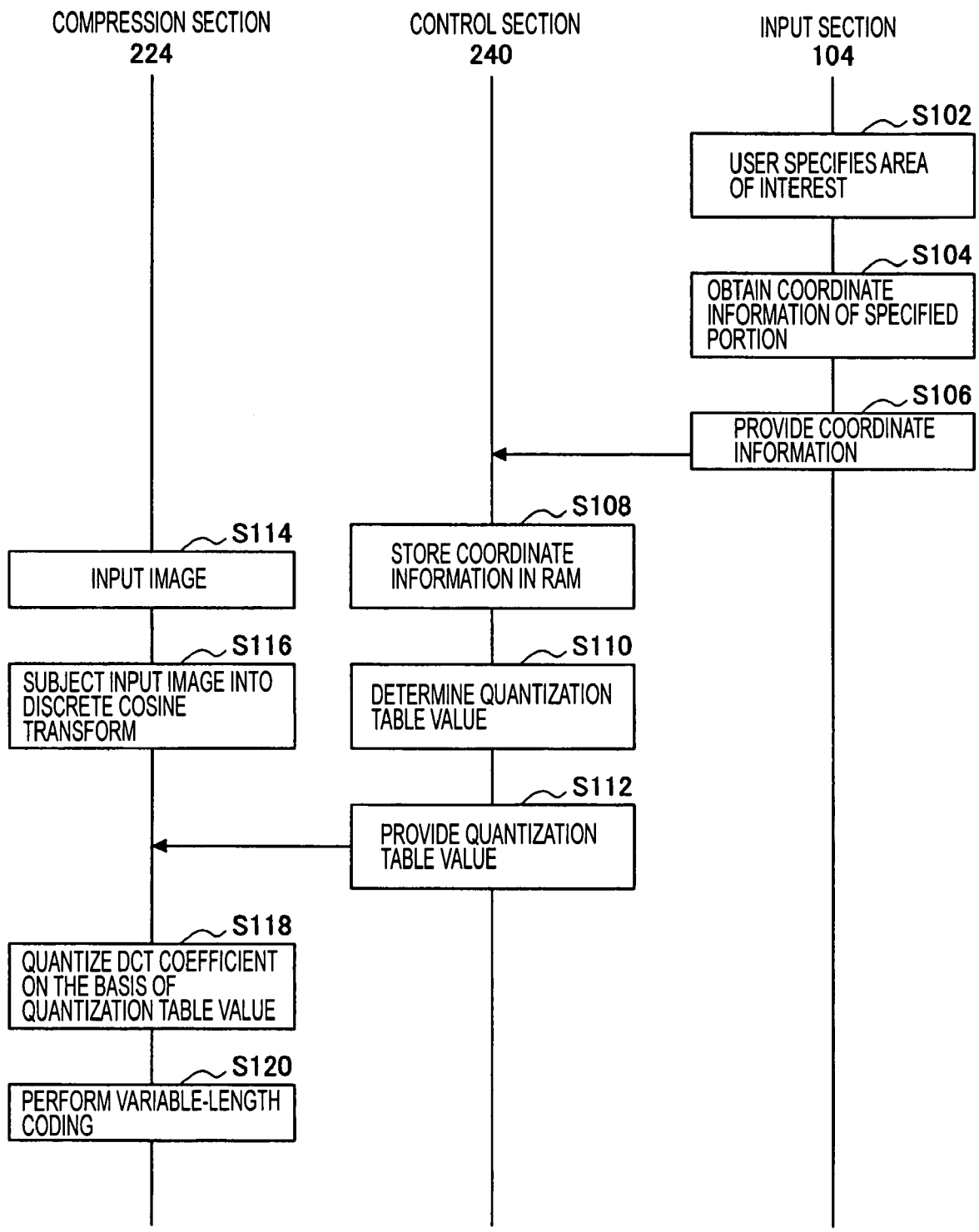
FIG. 3 is a timing chart showing an image coding method according to the embodiment of the present invention.

In the foregoing, the imaging apparatus 100 has been described briefly. Next, the image coding method according to this embodiment will be described briefly with reference to FIG. 3.

Initially, as an example of an area of interest specification step, in step S102, a user, such as a cameraman, specifies an area of interest by touching the display section 102 provided in the imaging apparatus 100 (S102). More specifically, the area of interest is specified by touching a desired portion of the input section 104, such as a touch panel, disposed on the display section 102. Next, as an example of a positional information obtaining step, in step S104, the input section 104 detects the position of the specified area of interest in order to obtain the coordinate information (S104). Thereafter, the obtained coordinate information is provided to the control section 240 (S106). The "area of interest" refers to an area in which a difference in the compression rate is provided with respect to the remaining area, and in this embodiment, the amount of code of the area of interest is processed so as to be larger than that in the remaining area.

In step S108, the control section 240 stores the coordinate information provided from the input section 104 in, for example, the RAM 244 (S108). Thereafter, as an example of a compression rate setting step, in step S110, the compression section 224 determines a quantization table value used when the image is compressed (S110) and provides the quantization table value to the compression section 224 (S112). By changing the quantization table value, the compression rate of the image can be changed.

On the other hand, in step S112, a frame image to be compressed is input to the compression section 224 (S114). More specifically, for example, a digitized frame image is obtained from the preprocessing circuit 206 of the imaging section 200 as described above. The compression section 224 first performs a discrete cosine transform (DCT) in order to compress that frame image. Thereafter, as an example of a coding step, a DCT coefficient is quantized, and in that case, the quantization table value obtained from the control section 240 in step S112 is used (S118). Thereafter, variable-length coding, such as entropy coding and Huffman coding, is performed (S120). According to the above-described method, since the coordinate information of the area of interest specified by the user in the captured image displayed on the display section 102 is reflected in the quantization table value for determining the compression rate of the image, the compression rate can be changed by setting the quantization table value of the area of interest to be different from that of the remaining area.

In the foregoing, the image coding method has been described briefly. Next, the image coding method according to this embodiment will be described in detail with reference to FIGS. 4 to 7.

Figure 4:
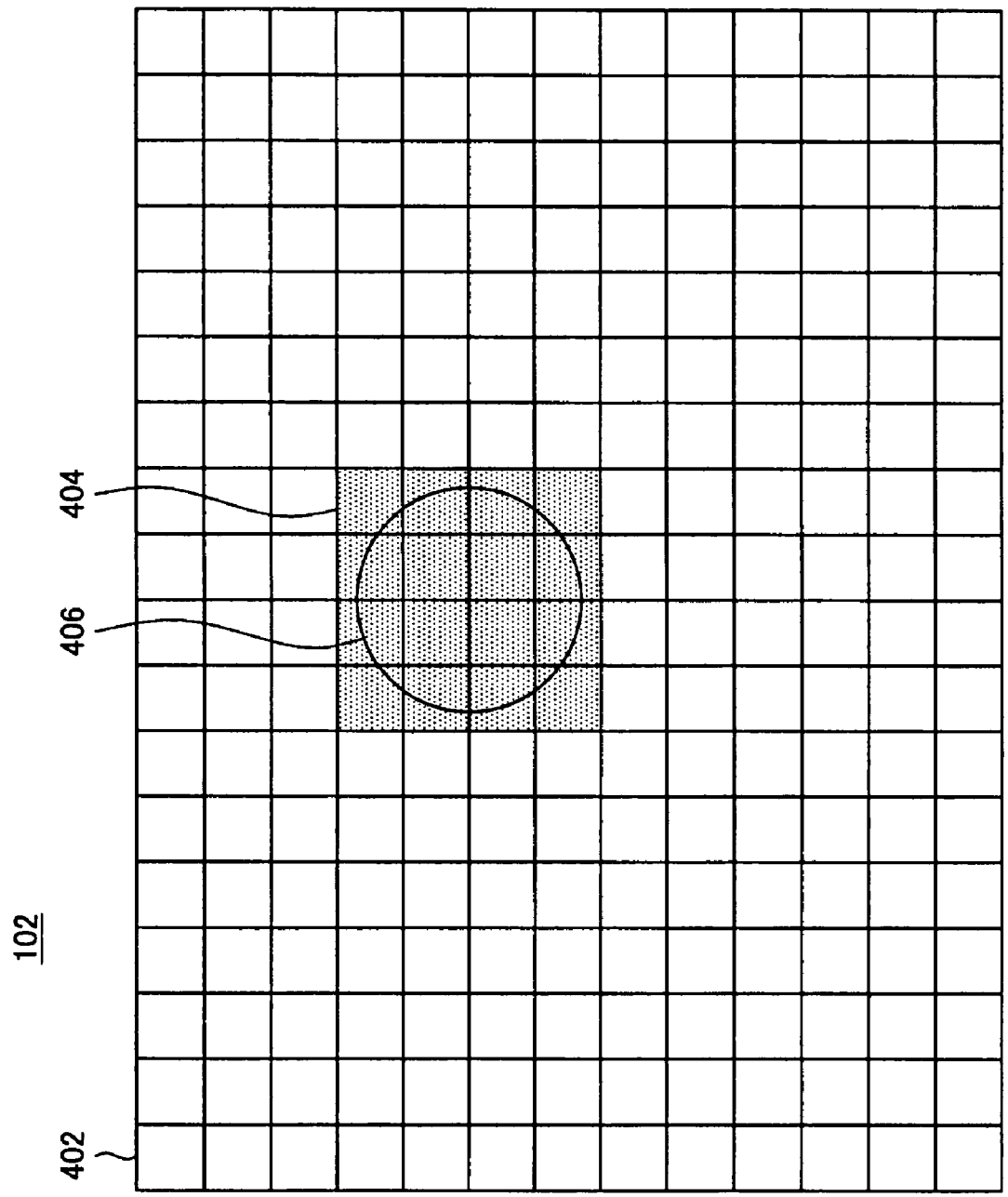
FIG. 4 is an illustration in which an image to be coded is divided into macro blocks according to the embodiment of the present invention.

FIG. 4 shows a state in which an input image input to the compression section 224 is divided into macro blocks. Reference numeral 402 denotes one macro block. In the compression section 224, since quantization is performed for each macro block, by changing the quantization table value according to the macro block, the compression rate is changed for each macro block, and thus the amount of code can be changed.

An area of interest 406 indicates an area of interest specified by the user touching the display section 102 with his/her fingertip. More specifically, based on the coordinate information of the area of interest, obtained by the input section 104 disposed appropriately on the display section 102, that area of interest is shown in the input image. Although one specified area of interest 406 is shown in FIG. 4, a plurality of areas of interest 406 can also be specified.

A specification area 404 indicates the range of a macro block containing the area of interest 406. Since quantization is performed in units of macro blocks as described above, the range of the macro block containing the area of interest 406 is denoted as the specification area 404 as a macro block to be compressed at a compression rate differing from that of the other macro blocks. The specification area 404 can be determined in accordance with the coordinate information. In the example of FIG. 4, the specification area 404 is set as a range containing the area of interest 406. Alternatively, setting can be performed as appropriate, for example, only the macro block in the vicinity of the central portion of the area of interest 406 is set as the area of interest 406 and a wider range is set as the specification area 404.

Next, a method for performing quantization for each macro block will be described with reference to FIG. 5. First, in step S202, the control section 240 initializes the position of the macro block to be processed (S202). More specifically, the macro block in the upper left of the image is made to be an object for quantization, for example, like the reference numeral 402 of FIG. 4.

Next, based on the area of interest 406 specified by the user, such as a cameraman, the specification area 404 is updated (S204). More specifically, for example, the number of the macro block belonging to the specification area 404 specified on the basis of the coordinate information of the area of interest 406 is stored in the RAM 244.

Thereafter, the control section 240 determines whether or not the macro block to be processed is a macro block belonging to the specification area 404, for example, by comparing the number of the macro block to be processed with the number of the macro block, which is stored in the RAM 244, belonging to the specification area 404 (S206). When the macro block to be processed belongs to the specification area 404, the process proceeds to step S208. In step S208, in order that a large amount of code is allocated to the macro block belonging to the specification area 404, a quantization table value having a low compression rate is selected, and the compression section 224 performs quantization on the basis of the quantization table value (S208). On the other hand, when it is determined in step S206 that the macro block to be processed does not belong to the specification area 404, the process proceeds to step S210. In step S210, in order that a comparatively small amount of code is allocated to the macro block that does not belong to the specification area 404, a quantization table value having a high compression rate is selected, and the compression section 224 performs quantization on the basis of the quantization table value (S210). Steps S208 and S210 are described below in detail with reference to FIGS. 6 and 7, respectively.

After the quantization table value of the macro block to be processed is determined in step S208 or S210, the control section 240 determines whether or not the macro block to be processed is the bottommost right macro block (S212). That is, by performing processing starting from the uppermost left macro block up to the bottommost right macro block, it is determined whether or not the quantization table values are set with respect to all the macro blocks for one image.

When the determination result shows that the macro block is not the bottommost right macro block, since a macro block to be processed remains in the frame image, the macro block to be processed in step S214 is moved, for example, one in the raster scan direction. On the other hand, when it is determined in step S212 that the macro block is the bottommost right macro block, the process proceeds to step S216. In step S216, it is determined whether or not, for example, a completion command due to the completion of the image capture is issued (S216). When the completion command is not issued, the process returns to step S202, where the quantization table value of each macro block for the next frame image is determined similarly. On the other hand, when the completion command is issued, the processing is completed.

According to the above-described method, the specification area 404 is updated for each frame image in step S204, and quantization of each macro block is performed on the basis of the updated specification area 404. For this reason, even when, for example, the area of interest 406 is changed every moment by the user by moving his/her fingertip while touching the touch panel, as a result the specification area 404 being updated in units of frame images, quantization processing is performed on the basis of the specification area 404 updated nearly in real time. Therefore, a large amount of code can be allocated to the area of interest 406 specified by the user.

Figure 5:
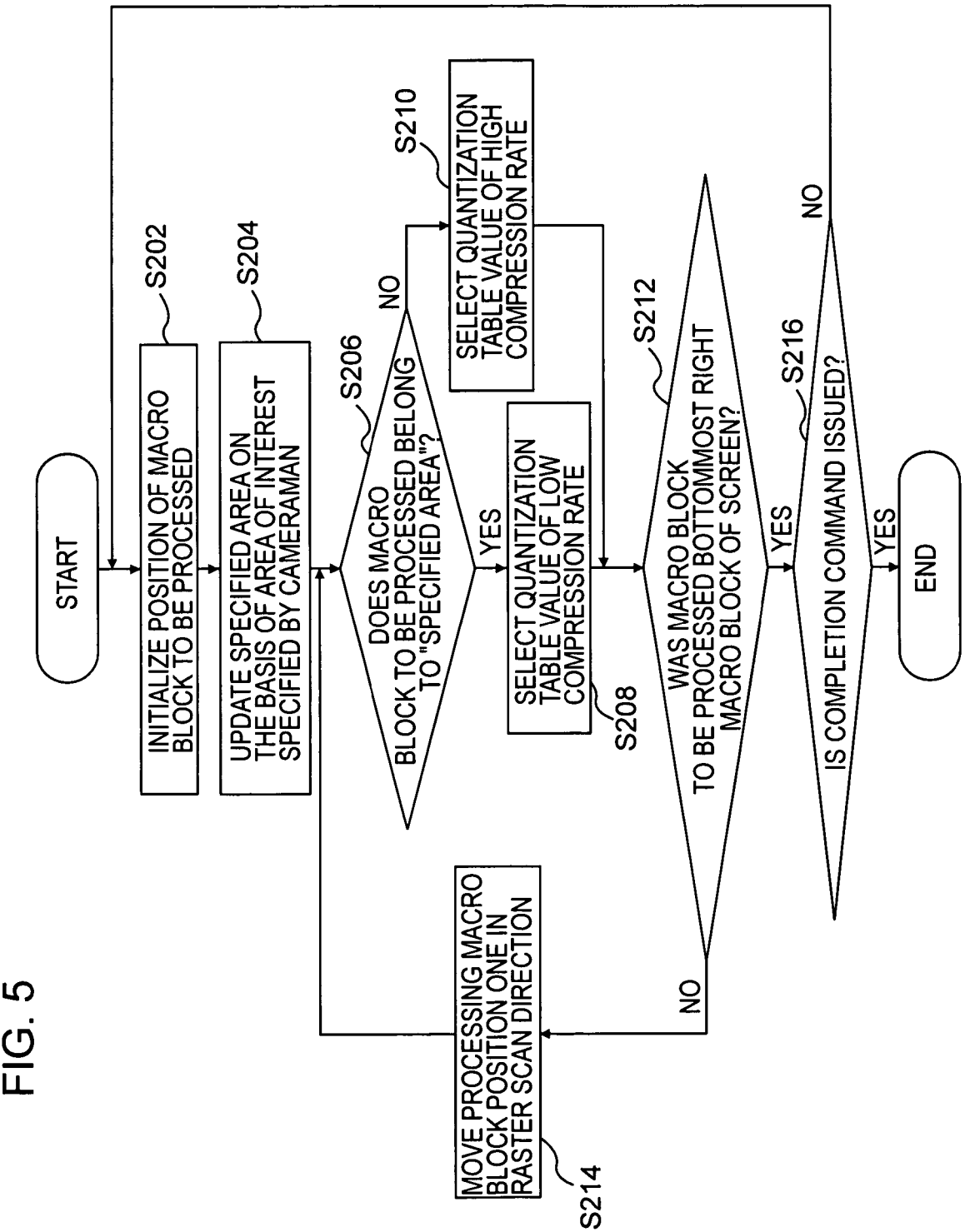
FIG. 5 is a flowchart showing a method for quantizing the macro block according to the embodiment of the present invention.
Figure 6:
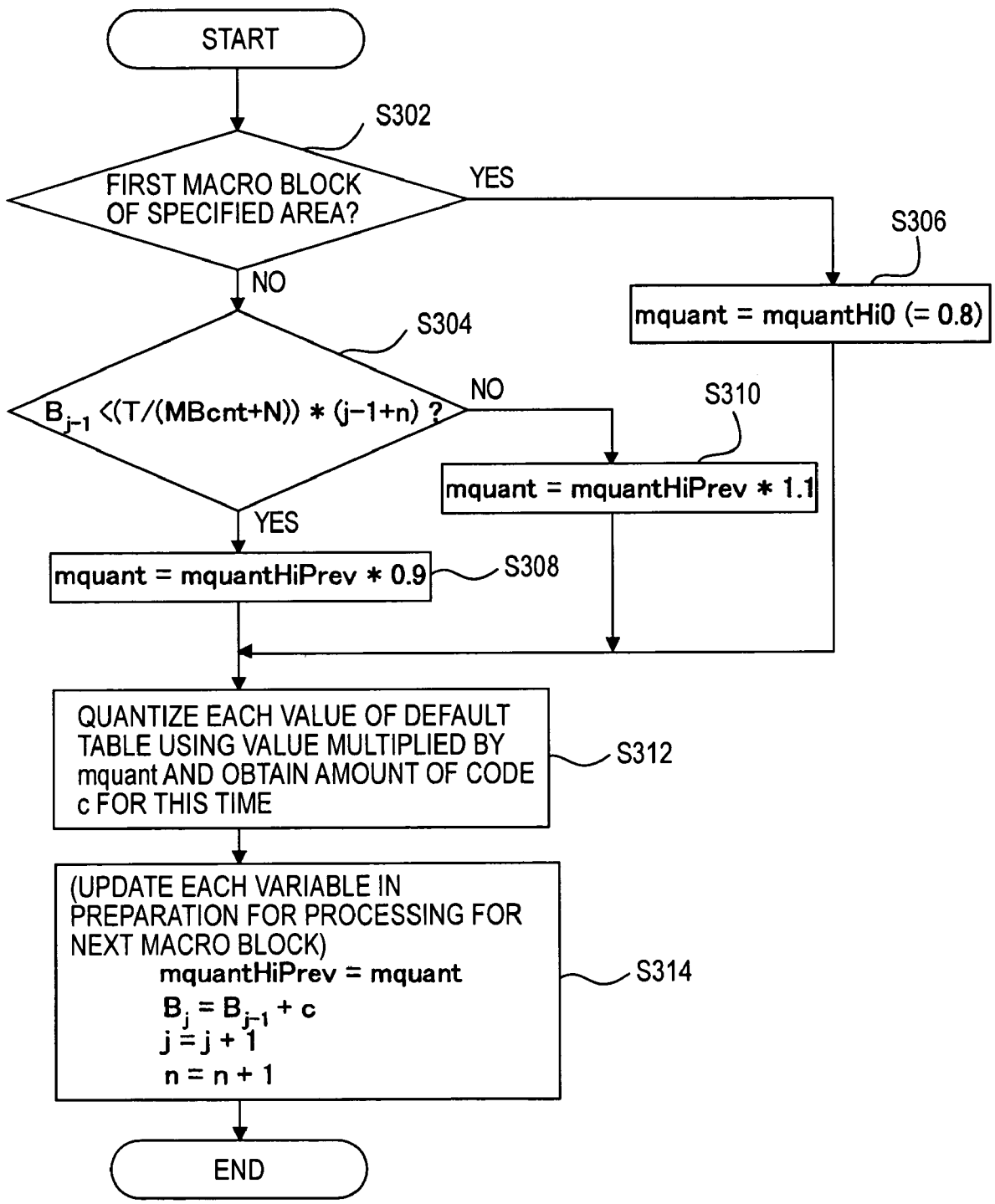
FIG. 6 is a flowchart showing details of the method for quantizing the macro block according to the embodiment of the present invention.

Next, referring to FIG. 6, a description is given of the process of step S208 in FIG. 5, that is, the process for selecting the quantization table value by which a low compression rate is achieved with respect to the specification area 404, and for performing quantization.

First, each variable used in FIG. 6 is described. T denotes a target amount of code (bits) in one frame. N denotes the total number of macro blocks belonging to the specification area 404. n denotes the "number of macro blocks for when processing is completed among the macro blocks belonging to the specification area 404 in one image currently being processed". MBcnt denotes the total number of macro blocks in one image, and for example, when an image of 720×480 pixel values is handled, it becomes 1350 (=vertically 30×horizontally 45). j denotes the number of the macro block currently being processed ($1 \leqq j$). Bj denotes the amount of generated code (the number of bits) up to the macro block number j. mquant denotes a coefficient to be multiplied to the default table value of the macro block. The smaller the coefficient, the smaller the quantization table value becomes to decrease the compression rate and to increase the amount of generated code. mquantHiPrev denotes the value of mquant when the macro block in the specification area 404 was quantized previously.

In step S302, it is determined whether or not the macro block currently being processed is the first macro block of the specification area 404 (S302). When it is the first macro block, the process proceeds to step S306, where mquantHi0, which is the initial value of mquant in the specification area 404, is substituted as mquant. For the value of mquantHi0, for example, 0.8 is used. On the other hand, when it is determined in step S302 that the macro block is not the first macro block belonging to the specification area 404, the process proceeds to step S304. In step S304, it is determined whether or not the "amount of actually generated code" (the left side) when the previous quantization of the macro block was completed is smaller than the "total target amount of code" (the right side) when the previous quantization of the macro block was completed (S304).

Here, the "target amount of code" is set on the basis of an upper-limit coding amount that is determined as a recordable or transmittable format when a captured image is recorded on a recording medium or when a captured image is transmitted to another computer via an external I/F. In this embodiment, the target amount of code may be determined for each frame image of the moving image, and the quantization table value of each macro block may be determined according to the target amount of code so that all the frame images forming the moving image have an amount of code less than the target amount of code. According to the above-described method, the amounts of coding of each frame image become almost the same, and all the frame images can be made to have a predetermined image quality while the image quality is made different partially within one frame image.

Furthermore, the target amount of code may be determined in the time unit. In that case, while a different amount of code is allocated for each frame image forming the moving image, the quantization table value of each macro block is determined according to the target amount of code so that the total amount of code within a predetermined time becomes less than the target amount of code. According to the above-described method, for example, when there are a frame image having many specification areas 404 that should have a high image quality within a predetermined time and a frame image having a smaller number of specification areas 404, while a larger amount of code is allocated to the frame image having many specification areas 404 in order to maintain the specification area 404 at a high image quality, a smaller amount of code is allocated to the frame image having a smaller number of specification areas 404, thus making it possible to suppress the amount of code to less than the target amount of code as a whole.

Referring back to FIG. 6, when it is determined in step S304 that the amount of actually generated code is smaller than the total target amount of code, the process proceeds to step S308, where the coefficient to be multiplied to the default table value of the macro block is multiplied by, for example, 0.9 in order to make the coefficient to be a value smaller than the previous coefficient. That is, since the amount of generated code is less than the target amount of code when the previous processing of the macro block was completed, in order that a slightly larger amount of code is generated so as to approach the target amount of code with respect to the macro block at this time, the quantization table value is decreased to a smaller value in order to decrease the compression rate.

On the other hand, when it is determined in step S304 that the amount of actually generated code is larger than the total target amount of code, the process proceeds to step S310, where the coefficient to be multiplied to the default table value of the macro block is multiplied by, for example, 1.1, so as to make the coefficient to a value greater than the previous coefficient. That is, since the amount of generated code is larger than the target amount of code when the previous processing of the macro block was completed, in order that a slightly smaller amount of code is generated so as to approach the target amount of code with respect to the macro block at this time, the quantization table value is increased to a larger value so as to increase the compression rate.

Next, in step S312, the coefficient obtained in step S308 or S310 above is multiplied to the default value of the quantization table value, the macro block to be processed is quantized on the basis of the multiplied quantization table value, and the amount of code of that macro block is obtained (S312). Thereafter, the value of each variable is updated in preparation for the processing of the next macro block (S314).

According to the above-described method, it is possible to allocate the largest amount of code as possible to the macro block belonging to the specification area 404 without exceeding the target amount of code as a whole.

Figure 7:
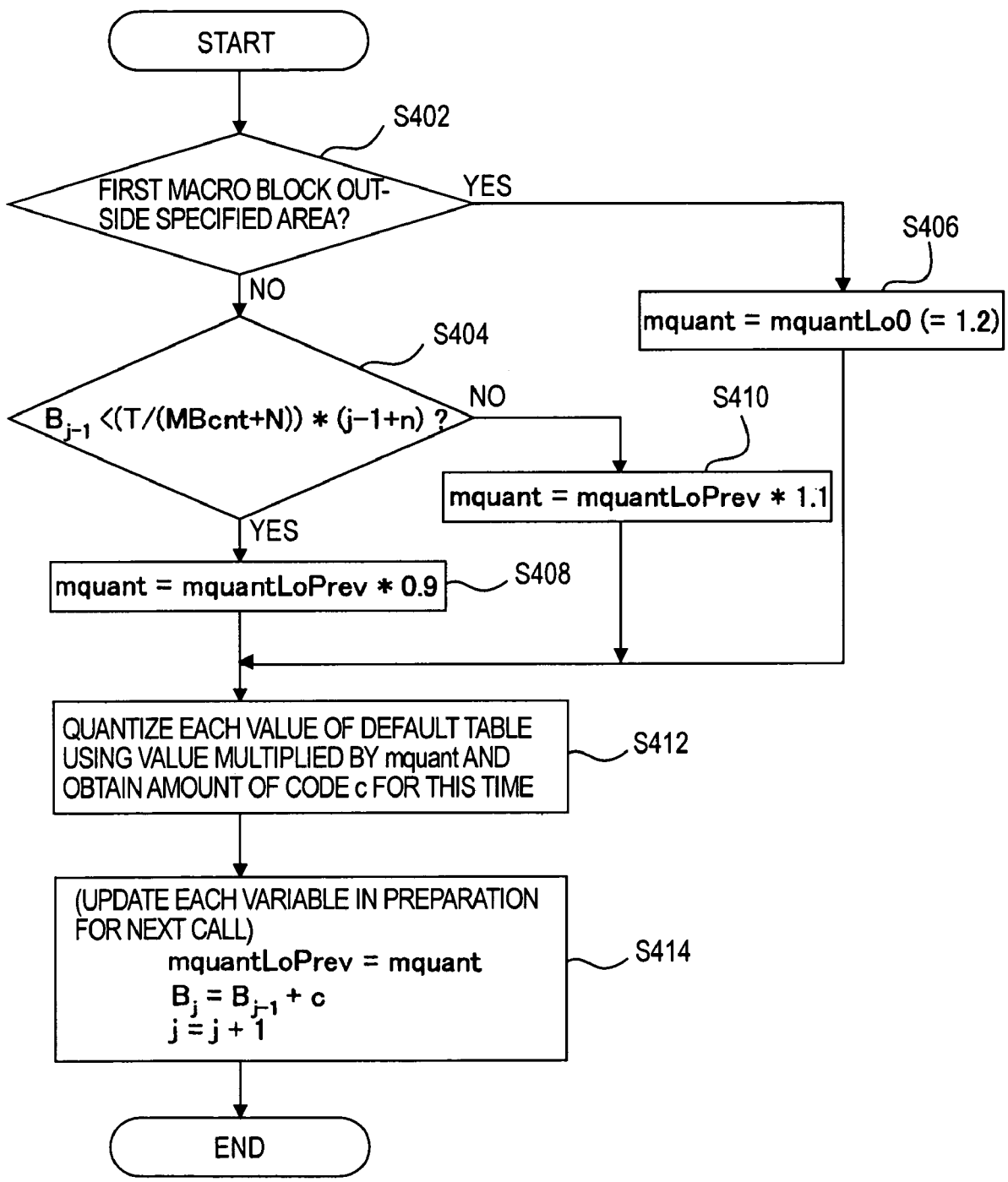
FIG. 7 is a flowchart showing details of the method for quantizing the macro block according to the embodiment of the present invention.

Next, referring to FIG. 7, a description is given of the process of step S210 in FIG. 5, that is, the process for selecting a quantization table value by which a high compression rate is achieved with respect to portions other than the specification area 404 and for performing quantization.

First, each variable used in FIG. 7 is described. Since T, N, n, MBcnt, and Bj are identical to those described with reference to FIG. 6, descriptions thereof are omitted. mquantLo-Prev denotes the value of mquant when a macro block outside the specification area 404 was quantized previously.

In step S402, it is determined whether or not the macro block currently being processed is a first macro block outside the specification area 404 (S402). When it is the first macro block, the process proceeds to step S406, where mquantLo0, which is the initial value of mquant outside the specification area 404, is substituted as mquant. For the value of mquantHi0, for example, 1.2 is used. On the other hand, when it is determined in step S402 that the macro block is not the first macro block that does not belong to the specification area 404, the process proceeds to step S404. In step S404, it is determined whether or not the "amount of actually generated code" (the left side) when the previous quantization of the macro block was completed is smaller than the "total target amount of code" (the right side) when the previous quantization of the macro block was completed (S404).

When it is determined in step S404 that the amount of actually generated code is smaller than the total target amount of code, the process proceeds to step S408, where, for example, 0.9 is multiplied to the coefficient to be multiplied to the default table value of the macro block in order to make the coefficient to a value smaller than the previous coefficient.

On the other hand, when it is determined in step S404 that the amount of actually generated code is larger than the total target amount of code, the process proceeds to step S410, where, for example, 1.1 is multiplied to the coefficient to be multiplied to the default table value of the macro block in order to make the coefficient to a value greater than the previous coefficient.

Next, in step S412, the coefficient obtained in step S408 or S410 above is multiplied to the default value of the quantization table value, the macro block to be processed is quantized on the basis of the multiplied quantization table value, and the amount of code of that macro block is obtained (S412). Thereafter, the value of each variable is updated in preparation for the processing of the next macro block (S414). Unlike in FIG. 6, n, which is the number of macro blocks belonging to the specification area 404 for which processing is completed, is not updated.

In the foregoing, the method for performing quantization for each macro block has been described with reference to FIGS. 4 to 7. In the above-described examples, whether or not a larger amount of code should be allocated is determined according to whether or not the macro block belongs to the specification area 404, and among the macro blocks belonging to the specification area 404, the adjustment of the amount of code is performed only so as to not exceed the target amount of code as a whole. Alternatively, a larger amount of code may also be allocated to a specific macro block among the macro blocks belonging to the specification area 404. If the input section 104 is capable of detecting pressure application like, for example, a tablet, the area specified by the user by a high pressure application within the area of interest 406 specified by the user can be distinguished from the other areas. As a consequence, it becomes possible to allocate an amount of code, which is larger than that of the other macro blocks within the specification area 404, for example, to the macro block to which the area specified by a high pressure application belongs.

Figure 8:
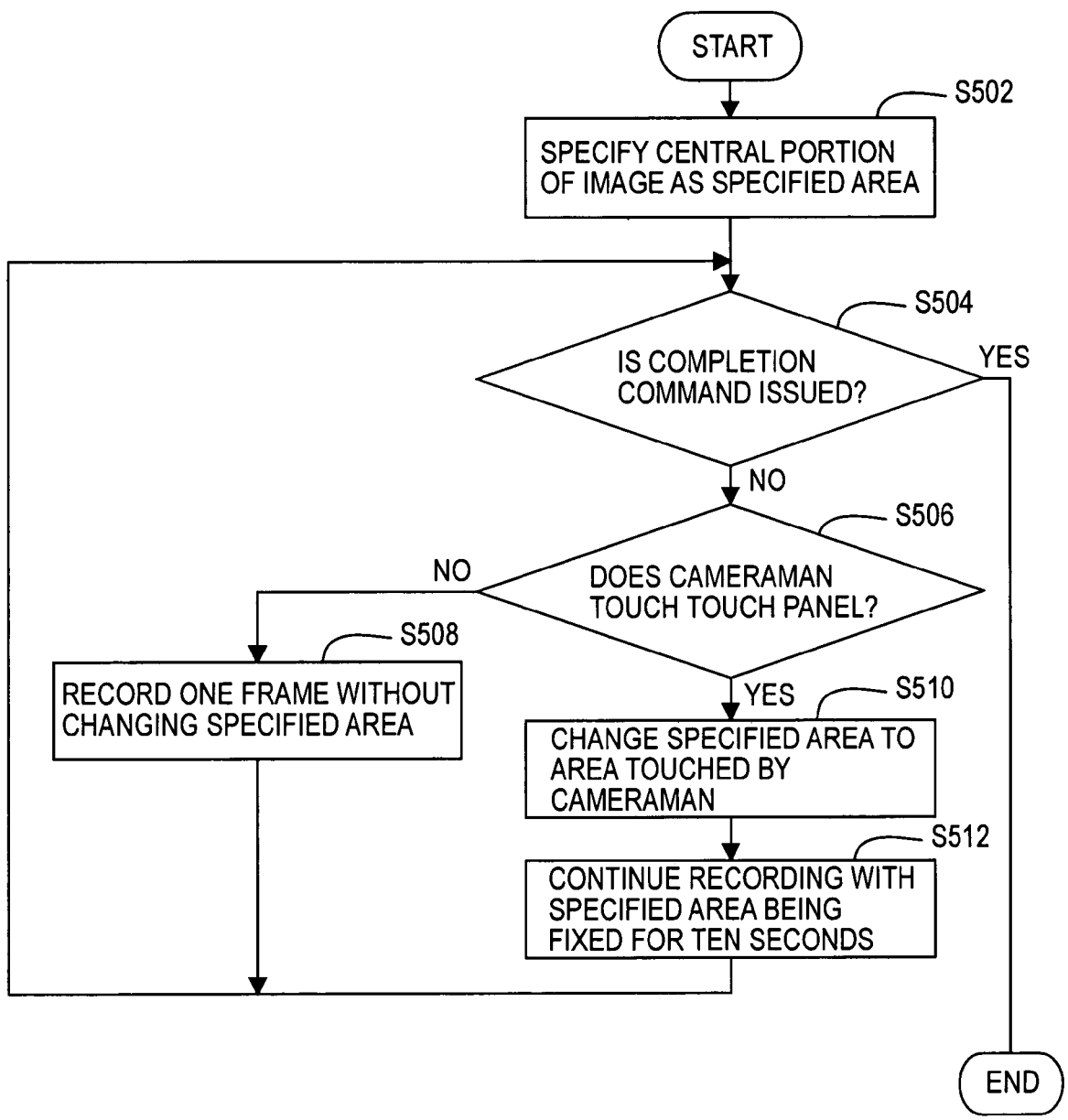
FIG. 8 is a flowchart showing an example of a method for determining a specification area according to the embodiment of the present invention.

Next, referring to FIG. 8, a description is given of another example of the method for determining the specification area 404. In FIG. 5, in step S204, the specification area 404 is updated for each frame image. According to such an example, whereas the portion specified by the user is reflected in the specification area 404 almost in real time, the user always needs to specify the area of interest using his/her fingertip, etc. Accordingly, in the example shown in FIG. 8, the area of interest specified once by the user is processed as the specification area 404 for a predetermined time.

First, in step S502, as the initial setting of the specification area 404, the control section 240 of the imaging apparatus 100 sets, for example, a portion near the central portion of the frame image as the specification area 404 and stores it in the RAM 244 (S502). Thereafter, in step S504, it is determined whether or not a completion command is issued, for example, due to the completion of the image capture (S504). When the completion command is issued, the processing is completed.

On the other hand, when the completion command is not issued, the processing is continued, and the process proceeds to step S506. In step S506, it is determined whether or not the cameraman has touched the input section 104 such as the touch panel (S506). More specifically, for example, it is determined whether or not the positional information of the area of interest specified by the cameraman is obtained by the input section 104 and the positional information of the RAM 244 is updated.

When the determination result shows that the input section 104 is not touched, that is, when the user does not specify the area of interest or when the area is not changed from the previously specified area of interest, the process proceeds to step S508, where a quantization process for one frame image is performed without changing the specification area 404. At the current stage, processing is performed in such a way that a larger amount of code is allocated to the macro block in the vicinity of the initialized central portion.

On the other hand, when the determination result in step S506 shows that the cameraman has touched the input section 104, that is, when the user has newly specified the area of interest, the process proceeds to step S510. In step S510, based on the area of interest specified by the user, in other words, based on the positional information obtained from the input section 104, the control section 240 determines the specification area 404 (S510). One frame image is processed in order to allocate a larger amount of code to the macro block belonging to the specification area 404. In step S512, the frame image contained in a predetermined time is processed without changing the specification area 404 determined in step S510 during the predetermined time (for example, ten seconds). Thereafter, the process returns to step S504.

According to the above-described method, first, even when the user does not specify the area of interest, since the macro block in the vicinity of the central portion of the frame image is set as the specification area 404, the portion in the vicinity of the central portion of the frame image can be made to have a high image quality. This is effective because, in general, the important portion that should have a high image quality often exists in the central portion of the screen. Furthermore, since the specified area of interest is set as the specification area 404 from when the user specifies the area of interest until a specification is performed again, the user does not need to always touch the input section 104. When the cameraman touches the input section 104, since the specification area 404 is changed, when the user changes the area of interest, the change is reflected in the image quality.

In the foregoing, the other method for determining the specification area 404 has been described. In addition to the above-described example, for the method of determining the specification area 404, a method for automatically tracking an object in the frame image may be used. For example, if a partial image of the area of interest specified by the user using the input section 104 can be recognized using image recognition technology and can be automatically tracked, as a result of the control section 240 setting the partial image as the specification area 404, the partial image of the area of interest specified by the user can be tracked to make it have a high image quality. According to such a method, for example, when the partial image specified by the user is a human face, in the imaging apparatus 100, recording is possible with a high image quality while automatically tracking the human face, which is the partial image. Thus, the imaging apparatus 100 can be applied to a monitoring camera or the like. In addition, rather than tracking the partial image itself, a tracking object (for example, a human face) may be extracted from the area of interest specified by the user using image recognition technology, and the area of interest and the specification area 404 may be changed according to the movement of the tracking object, so that a larger amount of code may be allocated thereto.

In the foregoing, the compression rate is decreased and a larger amount of code is allocated to make the area of interest have an image quality higher than that of the remaining area. However, the present invention is not restricted to such an example. Conversely to the above-described example, a larger amount of code may be allocated in such a way that the remaining area has a higher image quality than that of the area of interest. Consequently, for example, as a result of the user specifying the end portion of the display section 102 as an area of interest, it is possible to make the remaining area other than the end portion have a higher image quality.

It should be understood by those skilled in the art that various modifications, combinations, sub-combinations and alterations may occur depending on design requirements and other factors insofar as they are within the scope of the appended claims or the equivalents thereof.

What is claimed is:

1. An image coding method comprising:
   receiving from a user a command specifying an area of interest in a captured image displayed on a display section through a pressure sensitive input device, the command indicating areas of no pressure on the input device as not in the area of interest, areas of low pressure on the input device in the area of interest, and areas of high pressure on the input device in the area of interest;
   obtaining positional information of the area of interest;
   setting the compression rate of the area of interest and the compression rate of a remaining area in such a manner as to differ from each other on the basis of the positional information such that a compression rate not in the area of interest is greater than a compression rate in the areas of low pressure, and the compression rate in the areas of low pressure is greater than the compression rate in the areas of high pressure; and
   performing coding of the area of interest and coding of the remaining area on the basis of the corresponding compression rates.

2. The image coding method according to claim 1, wherein the compression rate of the area of interest and the compression rate of the remaining area are set in accordance with a target amount of code.

3. The image coding method according to claim 2, wherein the target amount of code is set with respect to one frame of the captured image.

4. The image coding method according to claim 2, wherein the target amount of code is set with respect to the time unit of the captured image.

5. The image coding method according to claim 1, wherein a predetermined tracking object is recognized from the area of interest, and the area of interest is changed in accordance with the movement of the tracking object.

6. The image coding method according to claim 1, wherein the area specified once as an area of interest is continued to be specified as an area of interest for a predetermined time.

7. The image coding method according to claim 1, further comprising:
   dividing the area of interest into a plurality of blocks; and
   setting a compression rate for each block to a different value.

8. An imaging apparatus comprising:
   a display section configured to display a captured image;
   a pressure sensitive input section configured to obtain positional information of an area of interest specified in the captured image displayed on the display section, the pressure sensitive input section configured to indicate areas of no pressure on the input section as not in the area of interest, areas of low pressure on the input section in the area of interest, and areas of high pressure on the input section in the area of interest;

a control section configured to set the compression rate of the area of interest and the compression rate of a remaining area in such a manner as to differ from each other on the basis of the positional information such that a compression rate not in the area of interest is greater than a compression rate in the areas of low pressure, and the compression rate in the areas of low pressure is greater than the compression rate in the areas of high pressure; and a compression section configured to perform coding of the area of interest and coding of the remaining area on the basis of the corresponding compression rates.

9. The imaging apparatus according to claim 8, wherein the compression rate of the area of interest and the compression rate of the remaining area are set in accordance with a target amount of code.

10. The imaging apparatus according to claim 9, wherein the target amount of code is set with respect to one frame of the captured image.

11. The imaging apparatus according to claim 9, wherein the target amount of code is set with respect to the time unit of the captured image.

12. The imaging apparatus according to claim 8, wherein the input section specifies the area of interest by applying pressure to the display section.

13. The imaging apparatus according to claim 8, wherein the control section recognizes a predetermined tracking object from the area of interest and changes the area of interest in accordance with the movement of the tracking object.

14. The imaging apparatus according to claim 8, wherein the input section is a touch panel.

15. The imaging apparatus according to claim 8, wherein the area specified once as an area of interest is continued to be specified as an area of interest for a predetermined time.

16. The image coding apparatus according to claim 8, wherein the control section is configured to divide the area of interest into a plurality of blocks, and to set a compression rate for each block to a different value.

17. A computer readable medium including computer executable instructions, wherein the instructions, when executed by a processor, cause the processor to perform a method comprising:

receiving from a user a command specifying an area of interest in a captured image displayed on a display section through a pressure sensitive input device, the command indicating areas of no pressure on the input device as not in the area of interest, areas of low pressure on the input device in the area of interest, and areas of high pressure on the input device in the area of interest;

obtaining positional information of the area of interest;

setting the compression rate of the area of interest and the compression rate of a remaining area in such a manner as to differ from each other on the basis of the positional information such that a compression rate not in the area of interest is greater than a compression rate in the areas of low pressure, and the compression rate in the areas of low pressure is greater than the compression rate in the areas of high pressure; and performing coding of the area of interest and coding of the remaining area on the basis of the corresponding compression rates.

18. The computer readable medium according to claim 17, wherein the method further comprises:

dividing the area of interest into a plurality of blocks; and setting a compression rate for each block to a different value.

* * * * *

UNITED STATES PATENT AND TRADEMARK OFFICE
CERTIFICATE OF CORRECTION

PATENT NO.        : 7,630,567 B2                                            Page 1 of 1
APPLICATION NO. : 11/086234
DATED             : December 8, 2009
INVENTOR(S)       : Fukushima et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1295 days.

Signed and Sealed this

Second Day of November, 2010

David J. Kappos
*Director of the United States Patent and Trademark Office*